UNITED STATES PATENT OFFICE.

FRANCISCO GARCIA P. LEAO, OF NEW YORK, N. Y.

PROCESS OF MAKING SUGAR FROM CANE.

1,083,545.          Specification of Letters Patent.     Patented Jan. 6, 1914.

No Drawing.     Application filed September 29, 1909.   Serial No. 520,083.

*To all whom it may concern:*

Be it known that I, FRANCISCO GARCIA P. LEAO, a citizen of the Republic of Brazil, South America, and residing at New York, in the county of New York and State of New York, have invented certain new and useful Improvements in Processes for Making Sugar from Cane, of which the following is a specification, such as will enable those skilled in the art to which it appertains to make and use the same.

This invention relates to the manufacture of sugar, or sugar and molasses from cane; and the object thereof is to provide an improved process of this class whereby sugar, or sugar and molasses may be manufactured from cane without the use of an expensive mechanism or plant, and whereby ordinary cane growers or farmers may manufacture sugar, or sugar and molasses from their own cane without being under the necessity of selling or transporting their cane to a plant for the purpose of having the sugar, or sugar and molasses manufactured for them; a further object being to provide an improved process of the class specified whereby sugar, or sugar and molasses may be manufactured from cane at a small cost or a fraction of the cost now involved in such manufacture and whereby a small fraction of the time now required for such operation will be necessary; the further object being to provide an improved process for the purpose specified whereby the operation of manufacturing sugar, or sugar and molasses from cane may be carried on during the entire year instead of being confined to a few months only as is now the case; and with these and other objects in view the invention consists in the processes hereinafter described and claimed.

In the practice of my invention the cane is first divided by means of any suitable tools or machinery into a fine mass, this operation being preferably performed by cutting or dividing the stalks or canes diagonally or transversely and longitudinally or in line with the fiber of the cane and transversely thereof.

The next step of the process consists in drying the finely divided mass of cane thus produced for a certain length of time, so as to evaporate therefrom practically all the water and make said mass as dry as possible. As the albuminoids of sugar cane coagulate or become hard between approximately 158° and 163° Fahrenheit, and will adhere to the sugar and make it impossible or difficult for the sugar to separate from the fiber in the process of drying, the evaporation is carried on at a temperature below that at which the albuminoids will dry and still remain soluble. This operation of evaporation may be accomplished by means of natural heat by the rays of the sun or by artificial heat at the desired temperature, or at a temperature below 158° Fahrenheit and as a result the sugar or saccharine substance in the cane assumes a dry or hard form which is soluble in water. Albuminoids will dry and remain soluble in a temperature below the point at which they coagulate but above 158° Fahrenheit they begin to coagulate, and in this operation they will clog or solidify so as to retain the sugar so it cannot be separated therefrom by water, and for this reason the evaporation is carried on at a temperature below that at which the albuminoids begin to coagulate which is 158° or approximately so.

The next or third step in this process is one of extraction which involves maceration or infusion and in this step the mass of cane which has been dried, as set out in the preceding paragraph, is thoroughly saturated with pure water either warm or hot, and after a predetermined time during which the sugar or saccharine substance in the cane is dissolved in the water, the mass of cane and water is subjected to suitable pressure by which all the liquid is separated from the mass.

The next step of the process is filtration or filtering and in this step the liquid produced as above described is filtered through any suitable filter or medium in the usual manner so as to remove therefrom any foreign substances.

The next step of the process is one of purification, and this may be accomplished by subjecting the liquid produced as above to ordinary purification process, either by the use of blood, charcoal, or any other means or substances in the usual manner.

The next step of the process is one of evaporation which may be carried on by heat and in a vacuum at the lowest possible temperature or in the same manner as in other processes for producing sugar, sugar or molasses from cane, and by any preferred means, preferably by means of a vacuum boiler, and this operation is carried on to a point where syrup is formed and after which the product may be refined by the usual or any preferred process and sugar, or sugar and molasses are produced in the usual way.

The sixth step of the process hereinbefore described or that involved in purification is not absolutely essential in the part of the process and may or may not be employed and is only necessary where an extra fine product is required or where perfectly white sugar or a very light quality of molasses are desirable.

If any amount of juice is pressed from the cane in the operation of finely dividing the same as set out in the first step of this process this juice may be poured back into the finely divided mass of cane and allowed to dry therewith as set out in the second step of said process.

The third step of the process or that of extraction which involves maceration or infusion and the separation of the liquid from the mass of cane after said mass has been dried and saturated with pure water and which also involves the separation of the liquid from the mass of cane by pressure may be repeated in order to be sure that all the saccharine substance is removed from the cane and this operation, or this step of the process, may be repeated two or three times if desired, or if necessary, until all the saccharine substance is removed from the cane and the liquid thus produced which contains more or less of the saccharine substance of the cane will be treated according to the following steps of the process which involves filtration, purification and evaporation.

It will be understood that the various steps of producing sugar, or sugar and molasses from cane according to this process may be carried out continuously, or if desired, after the cane has been finely divided and dried according to the first and second steps of the process, the product thus produced may be pressed into bales or placed in any suitable receptacles and retained in this form indefinitely if desired and the various following steps of the process may be carried out at any time during the period of a year or more if desired, and in this way the process of producing sugar, or sugar and molasses or of finishing said process may be completed at any time during the said year and will not interfere with any other work that the farmer or producer may have in hand. According to the present methods the production of sugar, or sugar and molasses from cane must be completed in a very short period of a few months of the year but with my improved process this operation may be carried on or extended throughout the year if desired. It will also be understood that while my improved process is particularly designed to enable farmers or growers to manufacture their own cane into sugar, or sugar and molasses, the said process may, if desired be used on a larger scale and all the cane produced in a particular locality or region, may be taken to a plant designed to carry out the said process if desired.

The bagasse or waste products produced by my improved process may be used for any purpose for which like material has heretofore been employed, as for instance the manufacture of paper or for any other purpose where fiber of such a nature can be used.

From the foregoing description it will be seen that my improved process does not necessarily involve expensive machinery or any expensive plant such as have been heretofore employed in the manufacture of sugar, or sugar and molasses from cane, the only apparatus necessary which bears any resemblance to that heretofore used is that part of said apparatus which is employed in the evaporation or refining portion of the process.

By means of my improved process farmers or growers may manufacture their own sugar, or sugar and molasses at any time during the year at a minimum cost and may hold the same for sale when the proper occasion or opportunity presents itself or said sugar, or sugar and molasses may be manufactured as expeditiously or in as short a time as is necessary.

Having fully described my invention what I claim as new, and desire to secure by Letters Patent is:—

1. The herein described process for producing sugar, or sugar and molasses from cane which involves the division of the cane into a fine mass, drying said mass at a temperature below approximately 158° Fahrenheit, saturating said mass with water to dissolve the saccharine substance therein, separating the said water from said mass by pressure and then evaporating and refining the product thus produced.

2. The herein described process for producing sugar, or sugar and molasses from cane which involves the division of the cane into a fine mass, drying said mass at a temperature below approximately 158° Fahrenheit, saturating said mass with water to dissolve the saccharine substance therein, separating the said water from said mass, and then evaporating and refining the product thus produced.

In testimony that I claim the foregoing as my invention I have signed my name in presence of the subscribing witnesses this 27th day of September 1909.

FRANCISCO GARCIA P. LEAO.

Witnesses:
C. E. MULREANY,
D. J. GLARYROCK.

Copies of this patent may be obtained for five cents each, by addressing the "Commissioner of Patents, Washington, D. C."